Dec. 1, 1953      E. J. DAVENPORT      2,661,445
CATHODE-RAY TUBE TEST DEVICE
Filed June 14, 1951
FIG. 1.
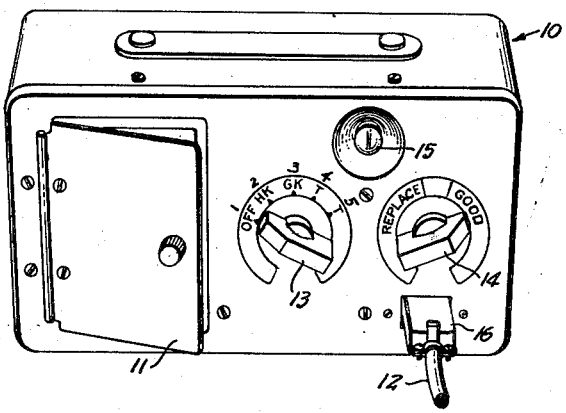
FIG. 2.
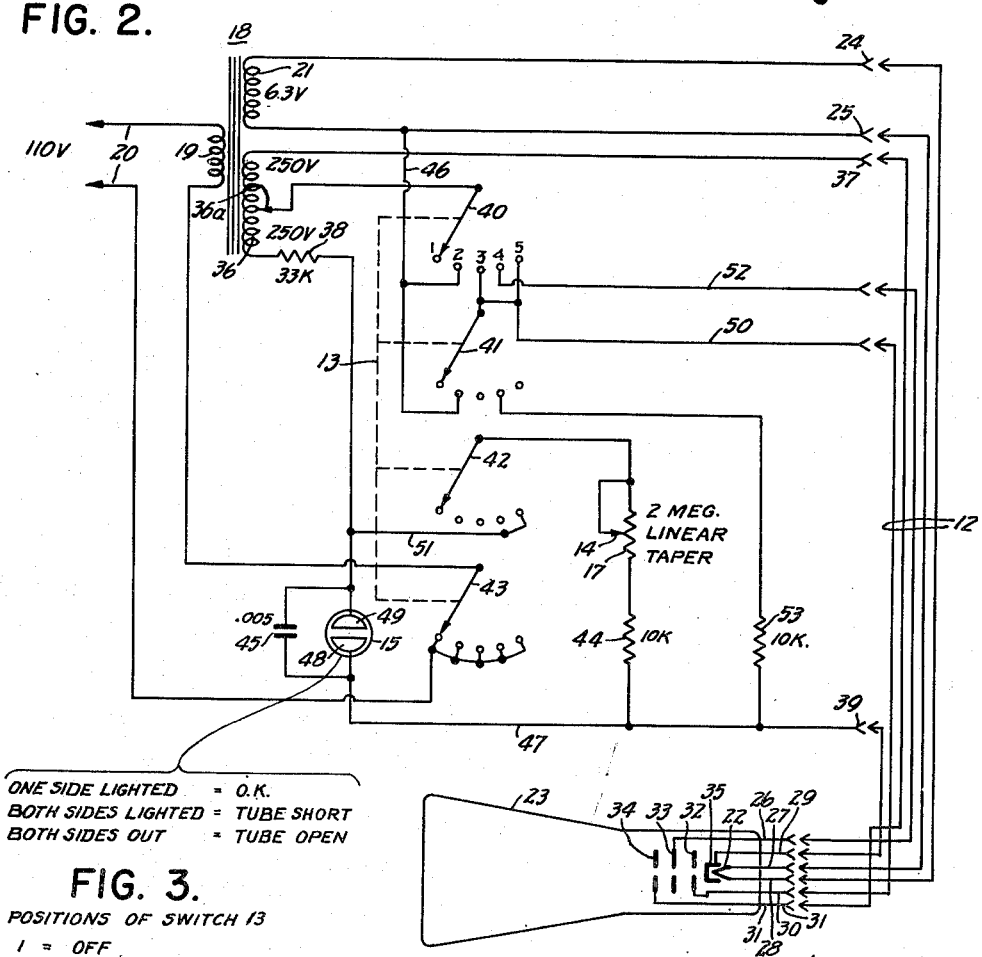
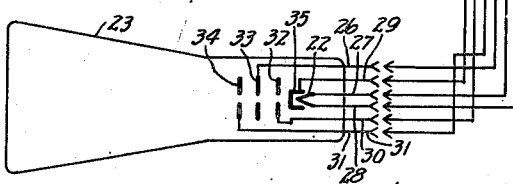
ONE SIDE LIGHTED = O.K.
BOTH SIDES LIGHTED = TUBE SHORT
BOTH SIDES OUT = TUBE OPEN
FIG. 3.
POSITIONS OF SWITCH 13
1 = OFF
2 = HEATER-TO-CATHODE
3 = GRID-TO-CATHODE
4 = ANODE-TO-CATHODE (TETRODES)
5 = ANODE-TO-CATHODE (TRIODES)
EDWARD J. DAVENPORT
INVENTOR
BY John J. Rogan
             Attorney Patented Dec. 1, 1953

2,661,445

UNITED STATES PATENT OFFICE 2,661,445

CATHODE-RAY TUBE TEST DEVICE

Edward J. Davenport, Elkins Park, Pa., assignor to National Union Radio Corporation, Orange, N. J., a corporation of Delaware Application June 14, 1951, Serial No. 231,619

7 Claims. (Cl. 324—23)

This invention relates to testing apparatus, and more particularly it relates to apparatus for testing cathode-ray tubes and the like.

A principal object of the invention is to provide a simplified and compact testing instrument for testing various conditions in a cathode-ray or similar electronic tube.

A feature of the invention relates to a cathode-ray tube test instrument, wherein a number of different standard or non-standard conditions can be exhibited by a 2-element glow discharge tube, such as the well-known twin-electrode neon tube.

Another feature relates to a simplified and portable cathode-ray tube testing instrument for giving a quick check of short circuits, open circuits, and non-standard cathode conditions.

A further feature relates to the novel organization, arrangement and relative location and interconnection of parts which cooperate to provide an improved and simplified cathode-ray tube test instrument.

In the drawing,

Fig. 1 is a perspective external view of the test instrument according to the invention.

Fig. 2 is a schematic wiring diagram of the instrument of Fig. 1 in conjunction with a typical cathode-ray tube under test.

Fig. 3 is a chart of the positional functions of the multi-position switch shown in Figs. 1 and 2.

Referring to the drawing, the instrument is housed in a suitable case 10 of metal, plastic, or the like. The interior of the casing may be divided into two sections by a suitable partition (not shown). The left-hand section is provided with a hinged door 11 to form a receptacle for the multi-conductor test cable 12 and the power line supply cord (not shown), and whatever other spare parts may be desired. The right-hand section contains the various electrical wiring and circuit components.

The front face of the casing 10 has four openings through two of which respectively extend the shaft for the multi-position switch 13 and for the cathode testing switch 14. The third opening receives the dual electrode neon bulb 15, and preferably the portion of the front wall of the case around this latter opening is reentrantly dish-shaped to shield the neon bulb and to render its glow more easily observable in daylight. The fourth opening is in front of the male end of a multi-contact plug or receptacle which cooperates with the corresponding multi-contact plug 16 wired to the conductors in cable 12. If desired, a suitable carrying strap or handle can be fastened to the top of the case.

The switch 13 has five different positional settings, designated "off," "HK," "GK," "Test" (tetrode) and "Test" (triode). The switch 14 is continuously variable, so that when turned clockwise, its brush slides along a 2-megohm linear-taper resistance 17 (Fig. 2), so that equal incremental changes of switch 14 produce corresponding equal resistance changes in the cathode test circuit. The scale on the front wall of the case cooperating with the handle of switch 14, can be marked in three regions: the first representing a cathode condition which is so poor as to indicate that the cathode-ray tube under test should be replaced; the second region representing an intermediate cathode condition; and the third region representing a cathode condition which is acceptable or good.

The internal wiring of the instrument is shown in Fig. 2. It includes a power input transformer 18 whose primary winding 19 is connected by a suitable line cord 20 to a 110-volt alternating current power supply. Transformer 18 has a low voltage secondary winding 21, for example of 6.3 volts, for supplying the usual 6 volts heating current to the cathode heater element 22 of the cathode-ray tube 23 under test, by way of the socket contacts 24, 25, and the corresponding conductors in cable 12. It will be understood, of course, that cable 12 has a multi-contact female socket or receptacle which fits the corresponding contact prongs 26–31 mounted on the base of the cathode-ray tube. The prongs 27, 28, are connected to the ends of the cathode heater 22; the prong 30 is connected to the first control grid 32; the prong 26 is connected to the second grid 33; the prong 31 is connected to the anode 34; and the prong 29 is connected to the cathode 35.

Merely by way of example, Fig. 2 shows the the instrument connected to a cathode-ray tube of the so-called tetrode type, that is, a tube having two grids between the cathode and the anode.

Transformer 18 has another secondary winding 36, one end of which is connected to the socket contact 37, and the other end of which is connected through a 33,000-ohm resistor 38, and thence through the dual electrode neon bulb 15 to the socket contact 39 which is connected through the cable 12 to the cathode 35. The electrodes of the neon bulb 15 are preferably shunted by a .005 mfd. condenser. The switch 13 has four switch arms or brushes 40, 41, 42, 43, which are of course movable as a unit over the respective fixed contact sets, there being five such contacts in each set. The winding 36 may be designed to produce a voltage of approximately 500 volts, and the adjustable tap 36a of this winding is connected to the switch brush 40. The lower end of winding 36 is also connected through the resistor 38 to the #4 and #5 contacts which cooperate with the switch brush 42. This latter brush is connected to one end of resistor 17, the other end of this resistor being connected in series with a 10,000-ohm resistor 44 to the cathode test terminal 39. The switch 14 abovementioned, has an arm which when rotated clockwise as seen in Fig. 1, progressively short-circuits successively-increasing sections of the resistor 17. Thus the position of switch 14 determines the amount of resistance bridged across the electrodes of bulb 15, and therefore the direct current voltage drop in said resistance is determined by the anode-to-cathode current of the cathoderay tube under test. It will be observed that the switch 14 with its associated resistor, is connected in circuit only when the switch 13 is operated on to its fourth or fifth contacts.

It will also be observed that when the switch 13 is in position #1, the brush 40 opens the return circuit from tap 36a of winding 36 to the socket contact 25, so that while the cathode may be heated to emission temperature, no space current can flow to either the grids 32, 33, or the anode 34.

In positions #1 and #2 of the switch 13, the neon bulb 15 and its shunt condenser 45 are connected in series with transformer winding 36 and in series with the anode-to-cathode space within tube 23. However, in the absence of a short circuit between the anode and cathode, or between the grid and cathode, or between the heater and cathode, there is insufficient voltage developed across the bulb 15 to cause either of the electrodes thereof to glow. It should also be observed that in all positions of the switch 13, the circuit through the primary winding 19 of the transformer is completed through brush 43.

The #1 position of switch 13 therefore corresponds to an "off" position in which no test conditions are being made. When the switch is moved to position #2, a direct current connection is established from the tap 36a, brush 40 and its associated #2 contact, conductor 46, terminals 24, 25, the corresponding conductors of cable 12, to heater element 22. The cathode 35 is connected over contact 39, conductor 47, electrode 48 of bulb 15, electrode 49, resistor 38, to the lower end of winding 36. If there is no short circuit between the cathode and heater, there will be sufficient voltage developed at the electrode 49 to cause that electrode to glow, but the electrode 48 will not glow. If there is a short circuit between the cathode and heater, sufficient current will flow through the above-described circuit, and both electrodes 48 and 49 will glow. If neither of the electrodes 48, 49 glows, this is an indication that there is an open circuit either to the cathode 35 or to the heater 22.

When the switch 13 is moved to position #3, a connection is established from the tap 36a, brush 40 and its #3 switch contact, conductor 50, to grid 32. A connection is also established from the cathode 35 through contact 39 and bulb 15 and resistance 38 to the lower end of winding 36. If there is no short circuit between the grid 32 and the cathode 35, only the electrode 49 glows. If, however, there is a short circuit or a low-resistance connection between the grid 32 and the cathode 35, sufficient current will flow to cause both electrode 48 and electrode 49 to glow. If neither electrode 48 nor electrode 49 glows, this is an indication that there is an open circuit either to the cathode 35 or to the grid 32.

When the switch 13 is moved to position #4 which is used for testing tetrodes, it is capable of testing the amount of electronic space current flowing from the cathode to anode 34, through grid 32 and grid 33, providing the tube 23 under test has two such grids. In this #4 position, the anode 34 is connected over the cable 12 to contact 37, the upper end of winding 36, to the lower end of that winding, through resistor 38, conductor 51, brush 42 and its #4 contact, thence through the adjustable resistor 17 controlled by switch 14, resistor 44, contact 39, to the cathode 35. Thus the full 500 volts of winding 36 is applied across the anode 34 and the cathode 35. However, only 250 volts are applied between the grid 32 and the cathode, via brush 40, contact #4 and conductor 52. At the same time the grid 32 is returned to the cathode through brush 41 and its #4 contact, and through resistance 53. This causes a predetermined amount of space current to flow from the cathode and anode, which develops a corresponding direct current voltage drop across the resistors 17 and 44. This voltage drop is directly applied across the electrodes 48 and 49 of bulb 15. If the space current is between predetermined limits representing a "good" tube, when the switch 14 is operated to its "good" position (Fig. 1), sufficient voltage is developed in the resistors 17 and 44 merely to cause the electrode 49 to glow. If there is a short circuit between the anode and cathode, or between the grid 32 and the cathode, or if there is too much space current produced for example by gaseous ionization or leakage between the anode and cathode within the tube or between the grid 33 and the cathode, an excessive amount of current will flow through the resistors 17 and 44 to develop a voltage across the bulb 15 to cause both electrodes 48 and 49 to glow. If neither electrode 48 nor electrode 49 glows for any position of switch 14, this is an indication that there is an open circuit either to the cathode or to the anode.

As is well-known in cathode-ray tubes, the cathode is coated so that its emission is confined to a minute central spot in the cathode sleeve or cap. This minute central spot is in alignment with a corresponding minute central aperture in the first grid disc, and in alignment with a corresponding minute central aperture in the second grid disc. In other words the tube is designed to produce as nearly as possible an electron beam whose cross section at the points where it traverses the first and second grids is commensurate with and even slightly less than the size of the grid aperture. Therefore, ordinary methods of measuring the so-called total emission from a cathode to a grid would give false indications as to the quality of a cathode-ray tube. The present invention provides an indication which represents the true beam current conditions. Thus if the beam is properly centered and the proper beam current reaches the anode when the switch 13 is in position #4, this will be indicated by only electrode 49 glowing. If the current is excessive, indicating ionization, or undesired direct current leaking between the cathode and first grid, or between the cathode and second grid, or between the cathode and anode, both electrodes 48 and 49 will glow. If however, the beam current actually reaching the anode is below the proper standard current, insufficient direct current voltage will be developed across resistors 17 and 44 to light either electrode 48 or electrode 49.

In position #5 of the switch which is used for testing triodes i. e., cathode-ray tubes having only one grid between cathode and anode, the center tap of winding 36 is connected over brush 40 and its #5 contact, conductor 50, to the grid 32, thus applying 250 volts to that grid with respect to the cathode. Consequently, the beam current flowing through the grid 32 to the anode 34 flows through resistors 17 and 44. The test indications for the beam current from the cathode are indicated in the same manner as for a tetrode. For example, if the electrode 49 alone glows when the switch arm 14 is moved to the "good" position, it is an indication that the beam current to the anode is satisfactory. If both electrodes 48 and 49 glow when the switch 14 is in the "replace" position, it is an indication that there is some gas or other leakage within the tube producing an abnormally great amount of total space current.

In using the device to test the useful beam current cathode emission, whether for tetrodes (position #4) or triodes (position #5), the switch 14 is initially turned completely counter-clockwise. It is then rotated clockwise until the bulb 15 is completely extinguished at both electrodes. The switch 14 is then turned slowly clockwise until the exact spot is reached where slight movement in the clockwise direction causes the electrode 49 alone to glow. If this condition exists with the switch arm 14 in registry with the "good" indication on the dial, the tube is satisfactory for beam current. If both electrodes 48 and 49 glow regardless of the position of switch 14, the tube is defective. On the other hand, if neither of the electrodes 48 nor 49 glows for any position of switch 14, it is an indication that the anode-to-cathode circuit is open, or there is insufficient beam current.

It will be understood, of course, that various changes and modifications may be made in the disclosed embodiment without departing from the spirit and scope of the invention.

For example, if the tube 23 is of the type having a 2.5 volt heater instead of a 6.3 volt heater, a 2-ohm resistor may be connected in series with the winding 21 to reduce the voltage accordingly.

What is claimed is:

1. An instrument for testing cathode-ray tubes and the like, comprising in combination, a source of test potential of different values, a gaseous glow indicator having a pair of spaced electrodes, a multi-contact switch having one position for testing the heater-to-cathode of a tube under test, another position to test the grid-to-cathode, and a third position to test the anode-cathode, and circuit connections interconnecting said switch, said source of potential and said glow tube for causing one electrode of the tube to glow for normal test condition, both electrodes to glow for short-circuit condition, and neither electrode to glow for open-circuit condition.

2. An instrument according to claim 1, in which said switch has at least one additional position for testing the electronic space current of the tube under test and for lighting either one electrode, both electrodes or neither electrode of said glow tube in accordance with normal, abnormal or questionable space current conditions in the tube under test.

3. An instrument for testing cathode-ray tubes and the like, comprising in combination a dual electrode gaseous glow tube indicator of the type which produces a glow at one electrode only for currents below a predetermined level and which produces a glow at both electrodes for currents at a higher level, a source of electric power, a multi-contact switch having at least two sets of contacts and cooperating brushes ganged for unitary operation, circuit connections effective in one position of said switch for interconnecting the cathode and heater elements of a cathode-ray tube under test to said indicator to cause only one electrode of the indicator to glow when the cathode and heater are neither open-circuited nor short-circuited while causing both electrodes to glow when the cathode and heater are substantially short-circuited, and other circuit means effective in another position of said switch for interconnecting the cathode and another electrode of said tube to said indicator to cause only one electrode of the indicator to glow when the cathode and said other electrode are neither open-circuited nor short-circuited while causing both electrodes to glow when the cathode and said other electrode are substantially short-circuited.

4. An instrument according to claim 3, in which additional circuit connections are provided for interconnecting the cathode and anode of the cathode-ray tube under test to said indicator to cause only one electrode of the indicator to glow when the cathode-anode are neither open-circuited nor short-circuited, while causing both electrodes to glow when the cathode-anode are substantially short-circuited.

5. An instrument according to claim 3, in which said switch is effective in a third position for connecting a calibrated resistor in circuit with the anode and cathode of the tube under test, said calibrated resistor being connected to said indicator to cause one electrode thereof to glow for a standard electron beam condition within the tube and to cause both electrodes to glow for excessive space currents through said tube.

6. An instrument for testing cathode-ray tubes and the like, comprising in combination, means for supplying low voltage heating current to the heater of a tube under test, means to supply a high voltage across the cathode and another electrode of said tube, a dual electrode glow discharge bulb connected in series with said high voltage, multi-position switch means having at least three different positional settings one to test the cathode-to-heater of said tube, another to test the cathode-to-grid of said tube, and a third to test the anode-to-cathode electronic beam current of said tube, said switch having at least two brushes and cooperating contacts one for each of said settings, circuit connections between the said brushes and said high voltage effective in one setting of the switch for connecting the heater and cathode of the tube in series with said source and with said bulb to cause only one electrode of the bulb to glow when said heater-cathode are neither open-circuited nor short-circuited, and to cause both electrodes of said bulb to glow if the cathode and heater are short-circuited; other circuit connections between one of said brushes and said high voltage effective in a second setting of said switch for connecting a grid and cathode of said tube in series with said bulb to cause only one electrode of said bulb to glow for a normal condition between the grid and cathode and for causing both electrodes of the bulb to glow for a short-circuit between said grid and cathode; and other circuit connections between said brushes and said high voltage source effective in a third setting of said switch to test the anode-cathode beam current of said tube, said switch having another brush effective in said third setting to connect a calibrated resistor in circuit with electrodes of said bulb for the purpose described.

7. An instrument according to claim 6, in which the low voltage heating current supply means comprises a secondary winding on a power input transformer and said high voltage means comprises another secondary winding on said transformer, said multi-position switch having a fourth brush effective in all of said three positions to complete a power circuit to the primary winding of said transformer.

EDWARD J. DAVENPORT.

References Cited in the file of this patent

UNITED STATES PATENTS

| Number | Name | Date |
|---|---|---|
| 1,815,375 | Johnson et al. | July 21, 1931 |
| 2,002,425 | Williams | May 21, 1935 |
| 2,133,610 | Fausett | Oct. 18, 1938 |
| 2,172,953 | Buchard | Sept. 12, 1939 |
| 2,196,466 | Laughter | Apr. 9, 1940 |
| 2,198,242 | Buchard | Apr. 23, 1940 |
| 2,264,066 | Buchard | Nov. 25, 1941 |
| 2,532,759 | Coate | Dec. 5, 1950 |